United States Patent
Aten et al.

(10) Patent No.: US 6,293,495 B1
(45) Date of Patent: Sep. 25, 2001

(54) PIVOTING DOOR THRUST REVERSER SYSTEM FOR TURBOFAN AIRCRAFT JET ENGINE

(75) Inventors: Michael R. Aten, San Diego; Gregory H. Matthias, Chula Vista, both of CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 09/456,783

(22) Filed: Dec. 8, 1999

(51) Int. Cl.$^7$ .......................................................... F02K 1/70
(52) U.S. Cl. .................................. 244/110 B; 239/265.23; 60/226.2
(58) Field of Search ....................... 244/110 B; 60/226.1, 60/226.2, 230; 239/265.19, 265.23, 265.27, 265.29, 265.31

(56) References Cited

U.S. PATENT DOCUMENTS

| | | | |
|---|---|---|---|
| 4,914,905 | * | 4/1990 | Dubois et al. . |
| 5,003,770 | * | 4/1991 | Schegerin et al. . |
| 5,347,808 | * | 9/1994 | Standish et al. .................. 244/110 B |
| 5,666,802 | * | 9/1997 | Lair . |
| 5,819,528 | * | 10/1998 | Masson . |
| 6,050,522 | * | 4/2000 | Brossier et al. ................. 244/110 B |

\* cited by examiner

Primary Examiner—Charles T. Jordan
Assistant Examiner—Tien Dinh
(74) Attorney, Agent, or Firm—Patrick J. Schlesinger

(57) ABSTRACT

An improved pivoting door thrust reverser system for a turbofan aircraft jet engine having a non-translatable housing and at least one thrust reverser door being pivotable between a stowed forward thrust position and a deployed reverse thrust position. The thrust reverser door is pivotable about a first axis and a kicker plate is hinged to the door at a second axis. As the door is deployed by an actuator a spring loaded roller clamp means keeps the kicker plate clamped to the actuator body until a portion of the kicker plate positively engages the thrust reverser door and the roller clamp means is then disengaged from the actuator body. A pivotable latch member is carried at the front portion of the kicker plate and cooperates with a cam guide channel positioned on the forward bulkhead of the thrust reverser system to allow the pivotable latch member to positively lock the kicker plate to the door after the kicker plate engages the door by an insertion of a spring loaded shear pin through the kicker plate into a lug carried on the door. The guide channel causes the latch member to maintain the spring loaded shear pin in a withdrawn position when the kicker plate is returned its stowed position as the reverser door is returned to its stowed position.

20 Claims, 5 Drawing Sheets

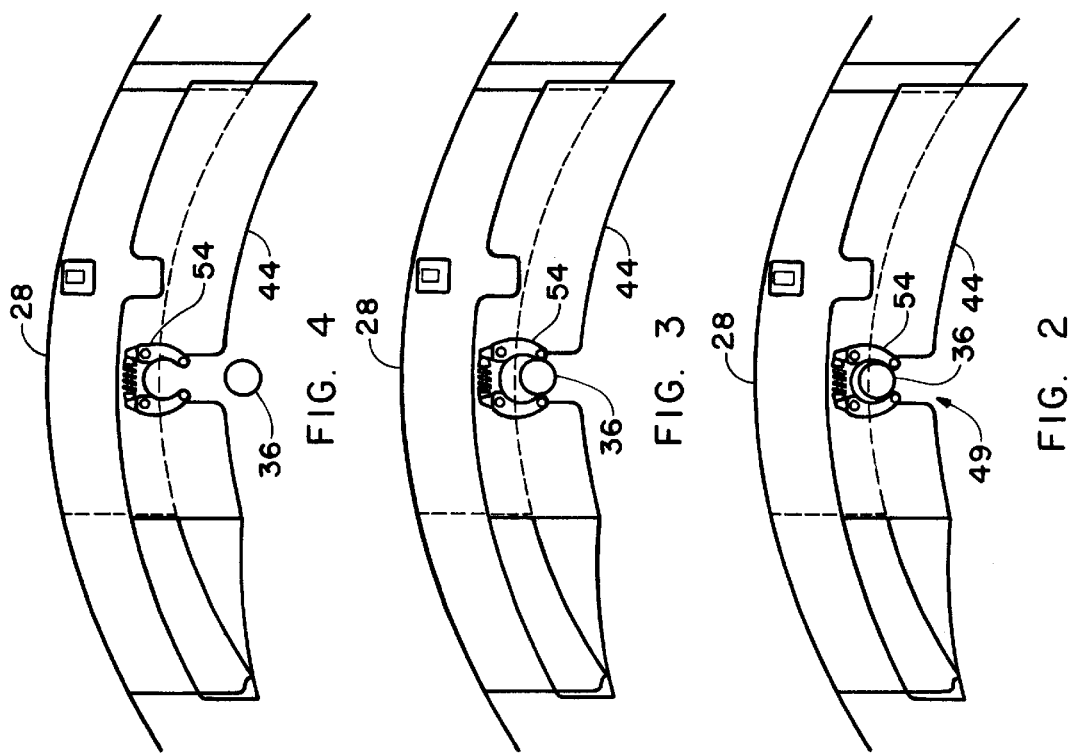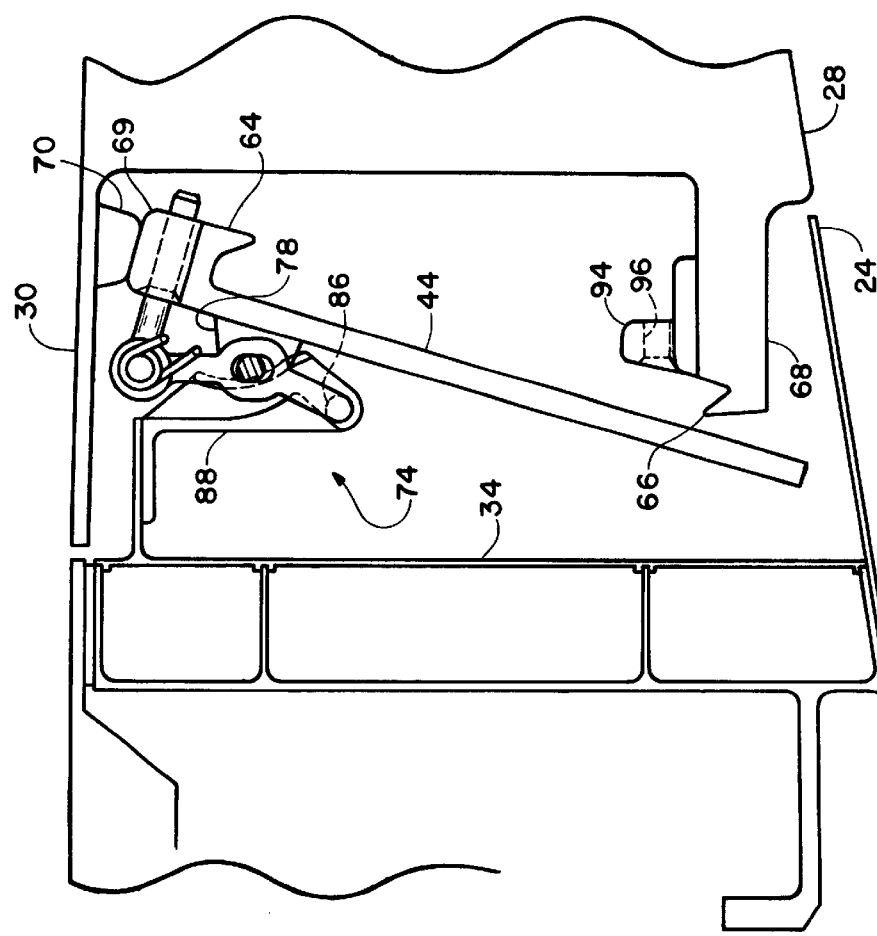

PIVOTING DOOR THRUST REVERSER SYSTEM FOR TURBOFAN AIRCRAFT JET ENGINE

BACKGROUND OF THE INVENTION

1. Field of the Invention

This invention relates generally to improvements in the field of thrust reversers for turbofan aircraft jet engines and more particularly, but not by way of limitation, to an improved pivoting door type thrust reverser system having a deployable cold air flow deflector.

2. Description of the Prior Art

Aircraft turbojet engines of the turbofan type are well known in the art and typically comprise a primary exhaust gas nozzle to exhaust the high temperature, high pressure gas emanating from the core engine. Turbofan type engines also include a secondary duct concentrically located about the primary exhaust gas duct so as to define an annular space therebetween. Large diameter turbofan engines direct a cold flow of air through this annular space to increase the performance characteristics of the aircraft engine.

Thrust reversers are also well known in the art and usually comprise one or more thrust reverser doors serving to redirect the flow of gases from their normal downstream direction to a direction which has a component in the forward direction. In civilian aircraft application, where such engines have a relatively high bypass ratio, the ratio of the quantity of air passing through the secondary or cold flow annular space to the quantity of gases passing through the primary duct, the thrust reverser may be applied solely to the secondary or cold flow duct. In that instance the thrust reverser door and the actuating mechanism may be integrated into the wall of the secondary duct.

In such known systems, the thrust reversing doors are displaceable between a retracted position, in which they form a part of the outer wall of the secondary duct and do not imped the air flow through the annular space and an extended position in which the doors will block at least a portion of the air flowing through the annular or bypass duct and re-direct it in a direction having a forward acting component.

Thrust reverser doors for pivoting door type thrust reverser systems may assume various shapes. In the instance of a flap-type door, a deflector will usually be attached to the upstream edge of the door so as to redirect the reversed cold air flow to have a more forward acting component. In order to provide for adequate performance of a thrust reverser using this flap type door, this deflector must have a minimum length extending inwardly from the inner surface of the thrust reverser door. In order to accommodate this length when the door is in a stowed or forward thrust position, the inner wall of the secondary or bypass duct usually is located adjacent to the end of the deflector to prevent the deflector from extending into the annular air space and disrupting the cold air flow.

However, in order to maximize the performance of the thrust reverser, the inner surface of the door usually defines a cavity or a concave portion. When the door is in its stowed position, this concavity is located downstream of the deflector. The presence of this concavity when the thrust reverser door is in the retracted position produces aerodynamic losses in the cold air flow passing through the bypass duct, thereby reducing the efficiency of the engine when in the normal thrust mode.

Thus, a need has long existed in the prior art for a cost efficient, improved pivoting door thrust reverser system that is simple in operation and which overcomes the difficulties involving in trying to overcome the concavity problem associated with a pivoting reverser door having a fixed deflector.

The following patents, while of interest in the general field to which the invention pertains, do not disclose the particular aspects of the invention that are of significant interest.

Efforts to overcome these shortcomings generally involve three types of approaches. One type, as seen in U.S. Pat. No. 4,894,985, is to employ a movable deflector that is mounted on the thrust reversing door and which is connected to a complicated linkage arrangement driven by a bell crank mounted on the door that is initially actuated by a connection to the extended end of an actuator. Another type is that seen in U.S. Pat. Nos. 4,916,895; 4,922,712, and 5,003,770, which illustrate movable panels carried by the thrust reverser door that normally are flush with an inner surface of the duct and which are retracted against or into the thrust reverser door as it is deployed to expose the fixed defector means.

A third type is seen in U.S. Pat. Nos. 4,858,430; 5,716,025, an 4,956,466, which show various schemes of attempting to extend downstream the upstream portion of the lateral opening to receive the door for the purpose of alleviating the concavity problem while still maintaining the full extension of a fixed deflector on the thrust reverser door. Such extensions involve perforated extensions, movable extensions and extensions secured to the actuator body.

It is a general object of the invention to provide an improved pivoting door type thrust reverser which provides a bypass fan duct having an outer flow surface that is smooth and which has no concavity or protrusion associated with the thrust reverser door.

It is another general object of the invention to provide a pivoting thrust reverser door that is straight forward in design and which is simple in order to enhance reliability and to provide low cost.

It is yet another object of the invention to provide a deployable kicker plate door arrangement which does not require internally mounted mechanisms within the door.

It is a specific object of the invention to provide a latch arrangement for the deployable kicker plate arrangement which allows for easy rigging during assembly as well as ease of access and maintenance.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

Briefly stated, the present invention contemplates a thrust reverser for a turbofan aircraft jet engine having a non-translatable housing extending around a longitudinal axis of the cowl of the core jet engine with an exterior surface, an interior surface defining an outer boundary of a cold air flow duct and defining a lateral opening and including at least one thrust reverser door pivotally attached to the housing so as to be movable between a first, forward thrust position wherein an outer surface of the door is substantially flush with the exterior surface of the housing and an inner surface of the door is substantially flush with the interior surface of the housing and the door covers the lateral opening. The door is then movable to a second, reverse thrust position wherein the lateral opening is uncovered and the door directs air through the lateral opening to provide a reverse thrust force.

An actuator is attached to a stationary frame extending between the exterior and interior surfaces of the housing and to the thrust reverser door to move the door between its first and second positions. A deflector or kicker plate is pivotally attached to the door and in its stowed position does not extend beyond the inner surface of the door. When the actuator is extended to rotate the door to its deployed position a spring loaded clamp arrangement carried by the kicker plate clamps the kicker plate to the actuator body and causes the kicker plate to be pivoted inwardly to a fully extended position. As the kicker plate reaches its fully extended position it engages the forward portion of the thrust reverser door and separates from the clamp arrangement and is locked to the door by a latch arrangement carried by the kicker plate. The latch arrangement includes a pivotable latch member that cooperates with a cam guide channel carried by the stationary frame to maintain the latch in its unlocked state when the door is stored and which follows the cam guide channel upon deployment of the door to permit a spring loaded shear pin to be inserted through the kicker plate into a apertured lug secured on the door to lock the kicker plate to the door during deployment.

The positive engagement of the kicker plate with the door during deployment may be ensured by the insertion of shear pins carried by the door into apertured lugs secured to the kicker plate or by a "V" shaped forward peripheral edge portion of the kicker plate engaging a similarly shaped "V" groove provided in the leading lower edge of the door.

The foregoing has outlined rather broadly the more pertinent and important features of the present invention in order that the detailed description of the invention that follows may be better understood so that the present contribution to the art may be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures and methods for carrying out the same purposes of the present invention. It should also be realized by those skilled in the art that such equivalent constructions and methods do not depart from the spirit and scope of the invention as set forth in the appended claims.

BRIEF DESCRIPTION OF THE DRAWINGS

For a fuller understanding of the nature and objects of the invention, reference should be had to the following detailed description taken in conjunction with the accompanying drawings in which:

FIG. 2 is a simplified sectional view illustrating the commencement of deployment of the thrust reverser door.

FIG. 3 is a simplified sectional view illustrating the engagement of the kicker plate with the thrust reverser door during deployment of the door.

FIG. 4 is a simplified sectional view illustrating the release of the kicker plate from clamping engagement with the actuator body after engagement with the thrust reverser door, as seen in FIG. 3.

FIG. 6 is a longitudinal sectional detail view illustrating the second latch arrangement that is used to lock the kicker plate to the thrust reverser door when the kicker plate engages the door, as seen in FIGS. 3 and 4.

Similar numerals refer to similar parts in the illustrated embodiments of the invention.

DETAILED DESCRIPTION OF THE PREFERRED EMBODIMENTS

Figure 1:
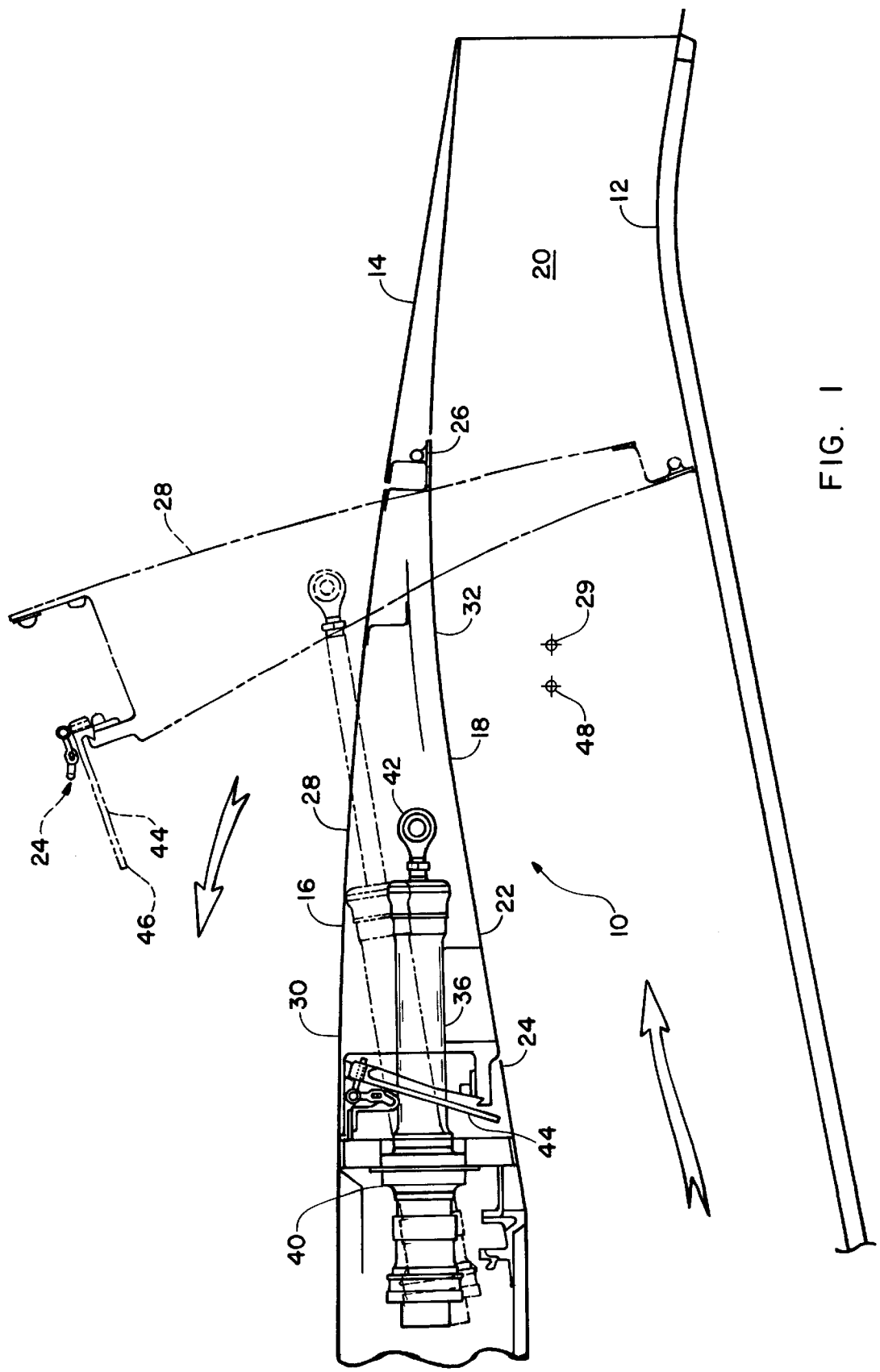
FIG. 1 is a partial, longitudinal sectional view of a thrust reverser for a turbofan aircraft jet engine having a non-translatable housing and being constructed in accordance with a preferred embodiment of the present invention.
Figure 5:
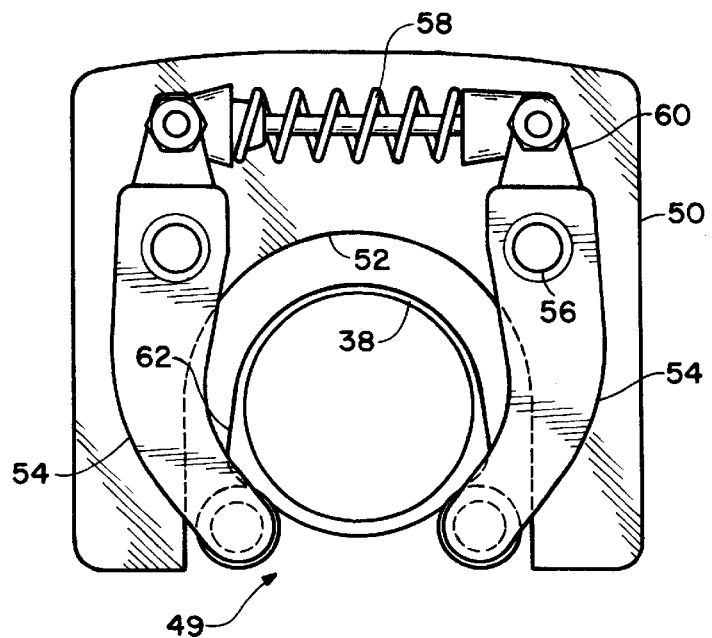
FIG. 5 is a simplified detail view of the first latch arrangement that is used to clamp the kicker plate to the actuator body.

Referring now to the drawings in detail and in particular to FIG. 1, the reference character 10 generally designates an improved pivoting door thrust reverser for a turbofan aircraft jet engine constructed in accordance with the present invention. A suitable core cowl 12 surrounds and extends along the longitudinal axis of the core of a turbofan aircraft jet engine (not shown). A thrust reverser housing 14 extends aft and surrounds the cowl 12. The housing 14 has an exterior surface 16 and an interior surface 18, which with the longitudinally extending core cowl 12 provides a bypass duct 20 for the flow of cold air provided by the fan portion (not shown) of the jet engine in the direction shown by the arrow in the duct 20. A lateral opening 22 is provided in the interior surface 18 and extends from a leading edge 24 to a trailing edge 26.

A pivoting thrust reverser door 28 covers the opening 22 and is pivoted about an axis point 29 on the housing 14 from a first, forward thrust position wherein the outer surface 30 of the door is substantially flush with the exterior surface 16 of the housing 14 and the inner surface 32 of the door 28 is substantially flush with the inner surface 18 of the housing 14. As seen in dotted outline in FIG. 1, the thrust reverser door 28 is pivotable to a second, thrust reversing position wherein the lateral opening 22 is uncovered and the door 28 is in contact with the cowl 12 to substantially block the bypass duct 20 and redirect the cold air flow through the opening 18 to provide a reverse thrust force, as shown by the arrow.

A stationary frame or bulkhead 34 extends between the exterior surface 16 and the interior surface 18 of the housing 14. An actuator means in the form of an extensible actuator 36 having an actuator body 38 is pivotally secured at a first end 40 to the stationary frame 34 and is pivotally secured at a second end 42 to the thrust reverser door 28. The actuator 36 is extensible in a known manner to move the thrust reverser door 28 from a first, forward thrust position to a second, reverse thrust position, as seen in FIG. 1.

A deflector means in the form of a kicker plate 44 having a distal edge 46 is pivotally secured to the thrust reverser door 28 at a pivot point 48. The kicker plate 44 is movable from a secured stowed position to a deployed position as the thrust reverser door 28 is moved to a second, reverse thrust position, as shown in dotted outline in FIG. 1, to deflect air flowing through the bypass duct 20 through the lateral opening 22 forwardly to provide a reverse upstream acting component.

A clamp means 49 carried by the deflector 44 cooperates with the actuator 36 to cause the deflector 44, as the thrust reverser door 28 is being rotated to a reverse thrust position, to be pivotally rotated toward the interior surface 18 of the housing 14 until it reaches its deployed position by engaging a portion of the thrust reverser door 28. In the illustrated embodiment of the invention, this clamp means, as seen in FIGS. 2–5, takes the form of a suitable latch housing 50 that is attached to the kicker plate 44 to surround an opening 52 provided in the kicker plate 44 to accommodate the actuator 36. The housing 50 also acts to reinforce and strengthen the area of the kicker plate 44 around the opening 52. Two opposed roller clamp members 54 are pivotally secured to the housing 50 by pivots 56 and are suitably spring loaded by a suitable spring arrangement 58 which is connected to the two adjacent ends 60 of the roller clamp members 54. As seen most clearly in FIG. 5, the actuator body 38 is preferably provided with a suitable ramp fitting 62 to provide sufficient resistance to release of the clamp means 49 until a desired point at which the kicker plate 44 engages the thrust reverser door 28, at which time the roller clamps 54 pass over the fitting 62 and the kicker plate 44 is released from the actuator body 38.

Referring again to FIGS. 2–4, it will be seen in FIG. 2 that as the door 28 commences to deploy by extension of the actuator 36 the kicker plate 44 is held in place on the actuator body by the clamp means 49 that grips the actuator body 38 and begins to pivot about the pivot point 48 on the thrust reverser door body 28. In FIG. 3, the kicker plate 44 engages a portion of the thrust reverser door 28, as will be hereinafter explained in greater detail, and continued extension of the actuator 36 causes the spring loaded clamp rollers 54 to pass over the ramp fitting 62 and be released from the actuator 36. In FIG. 4, the clamp means 49 is completely released from the actuator 36 as the thrust reverser door 28 and kicker plate 44 secured thereto are rotated to the second, thrust reversing position seen in FIG. 1.

Figure 7:
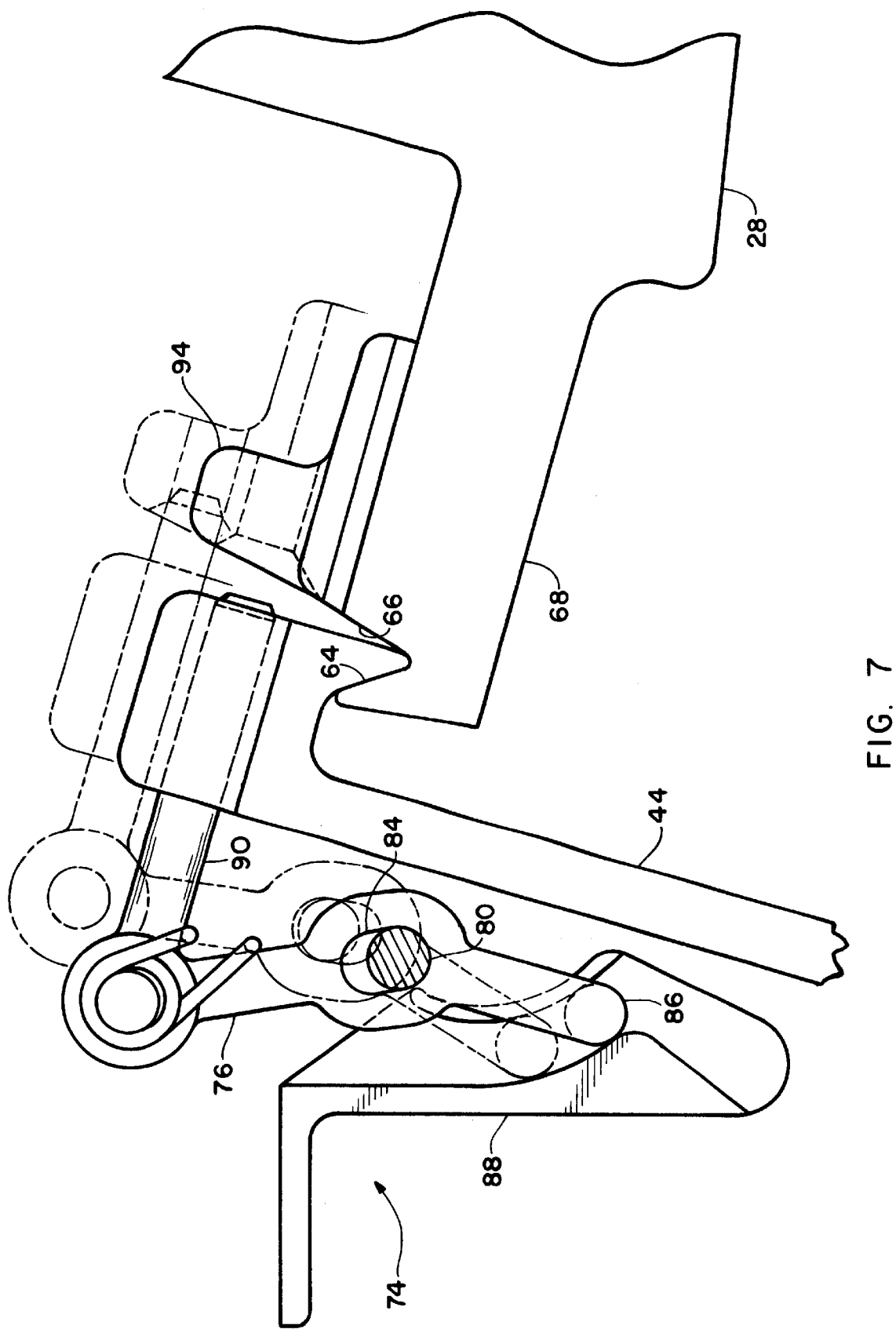
FIG. 7 a longitudinal sectional detail view illustrating the movement of the second latch arrangement as the thrust reverser door moves from a stowed position to a deployed position.

In FIGS. 1, 6 and 7, it will be seen how the kicker plate 44 positively engages the thrust reverser door 28 as the actuator 36 drives the door 28 to its second, thrust reversing position. The kicker plate 44 is provided an inner upper portion with a circumferential inwardly extending "V" shaped edge 64 which is adapted to be received by a complementarily shaped "V" shaped groove 66 provided on an inner surface of a leading portion 68 of the thrust reverser door 28. It will be seen in FIG. 6 that the kicker plate 44 is in a stowed position and at its upper portion 69 bears against seal 70 carried on the inner surface 72 of the outer portion 30 of door 28 and that the vertical height of the kicker plate 44 is only slightly less that the height of the door 28 at its forward leading portion. Thus, when the kicker plate 44 is fully extended, as seen in FIG. 1, the distal end 46 of the kicker plate 44 extends an extended length to turn the reversed flow of cold air to accentuate the forward component of such flow.

Figure 8:
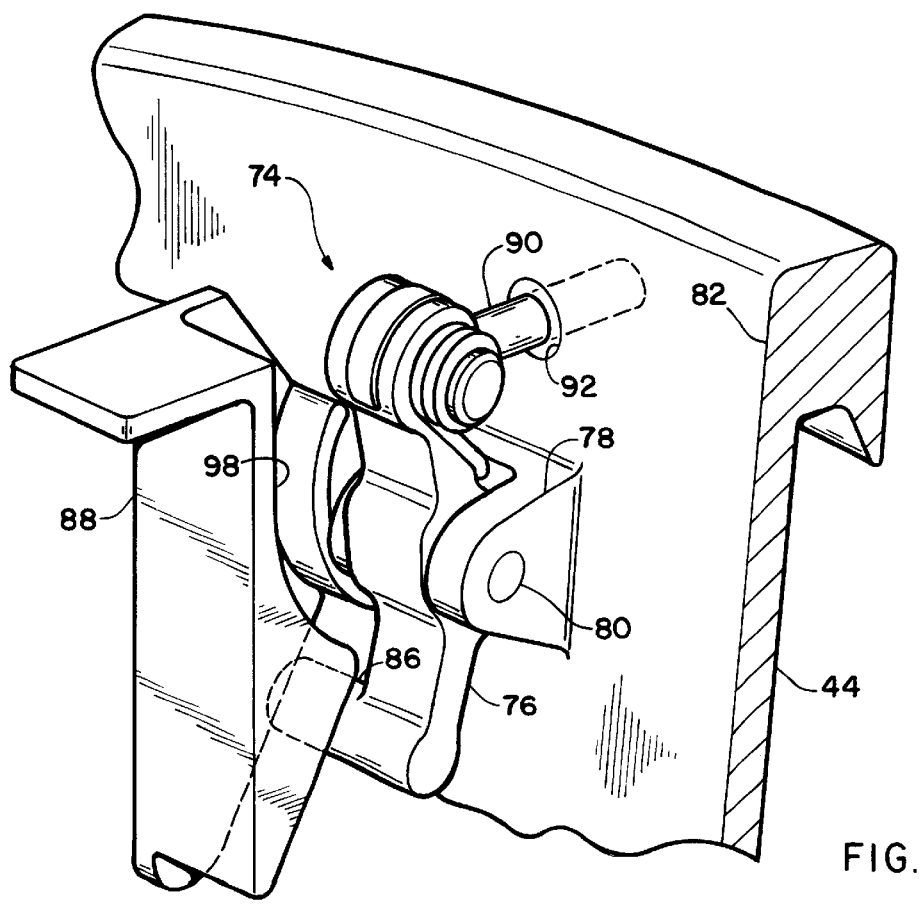
FIG. 8 is a perspective of a portion of the second latch arrangement to illustrate the movement shown in FIG. 7 to lock the kicker plate to the thrust reverser door.

A latch means 74 is carried on the deflector or kicker plate 44 to securely lock the kicker plate 44 to the thrust reversing door 28 when the kicker plate 44 positively engages a portion of the thrust reverser door 28 as it is pivoted to a second, thrust reversing position and as the roller clamps 54 release the cam portion 62 of the actuator 36. In the illustrated embodiment, this latch means 74, as seen most clearly in FIGS. 6,7 and 8, comprises at least one latch member 76 that is pivotally secured to a lug member 78 secured to an upper forward surface 82 of the kicker plate 44 and having a pivot shaft 80 that extends through a slot 84 provided in the latch member 76. The latch member 76 is provided at its inner portion with a laterally extending guide pin 86 which is removably inserted into a suitably configured cam guide member 88 that is secured to the partition member or forward bulkhead 34.

At its outer portion, the latch member 76 is provided with a spring loaded shear pin 90 that is pivotally secured to such latch member 76 and which extends through an aperture 92 of the upper portion 82 of the kicker plate 44 for locking engagement with the thrust reverser door 28. A suitable lug member 94 having an aperture 96 adapted to receive the shear pin 90 is suitably secured to the forward lower portion 68 of the thrust reversing door 28 for securely locking the kicker plate 44 to the door 28 as the kicker plate engages the door 28 as the door is pivoted to its second, thrust reversing position as described above.

In FIG. 6 it is seen that when the door 28 is in its first, secured position the guide pin 86 of the latch member 76 is located in the lower portion of the cam guide channel 98 of the cam member 88 to ensure that the shear pin 90 is cammed out of insertion into the apertured lug 94. As the door 28 commences its movement to its second, thrust reversing position by reason of the actuation of the actuator 36, the clamp rollers 54 carried by the kicker plate 44 remain in engagement with the cam portion 62 of the actuator 36, as seen in FIG. 1, and the guide member 86 begins to rise in the guide channel 98, as seen in FIG. 7. Then, as the kicker plate 44 positively engages the door 28 by the insertion of the "V" shaped edge 64 into the "V" groove 66 of the door 28 and the clamp rollers 54 release from the actuator 36, the guide member 86 travels further up the cam guide channel 98 until it reaches the position shown in dotted outline in FIG. 7 which aligns the shear pin 90 with the aperture 96 of the lug 94. As the door 28 then rotates further toward its deployed position the kicker plate 44 now positively engaged by door 28 also rises upwardly and the guide member 86 emerges from the guide channel 98 and the spring loaded shear pin 90 is inserted into the lug 94 thereby positively locking the kicker plate 44 to the door 28 in the second, thrust reversing position of the door 28. It will be understood, that when the door 28 is rotated in the reverse direction to be returned to its first, forward thrust position that the travel of the guide pin 86 within the cam guide channel 98 will be reversed. Also while one half of a latch means 74 has been illustrated in the FIGURES that latch means 74 will preferably include two mirror portions for redundancy purposes.

Figure 10:
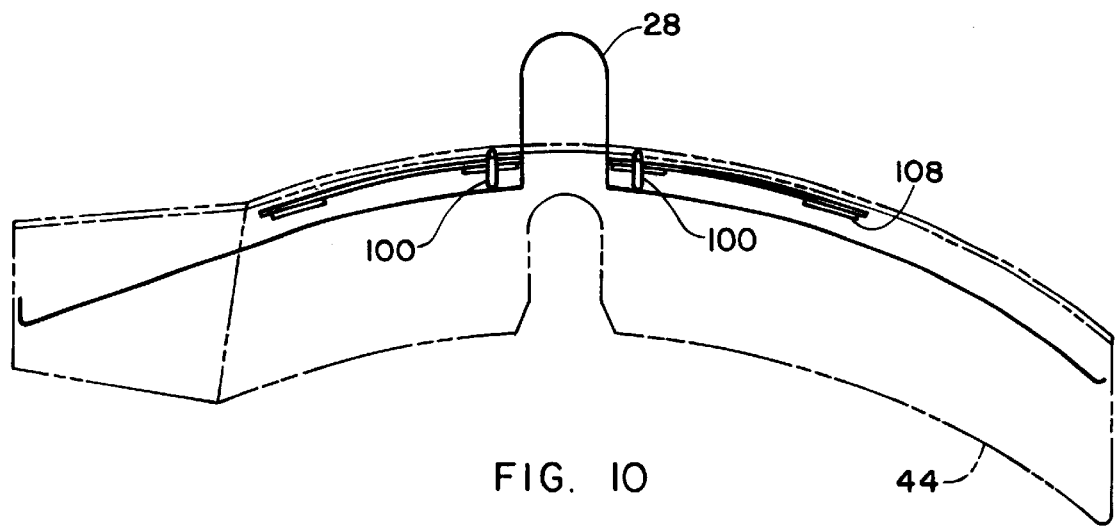
FIG. 10 is a simplified sectional view further illustrating the embodiment of FIG. 9 and also illustrating the resilient pad arrangement for damping vibration between the kicker plate and the thrust reverser door.
Figure 9:
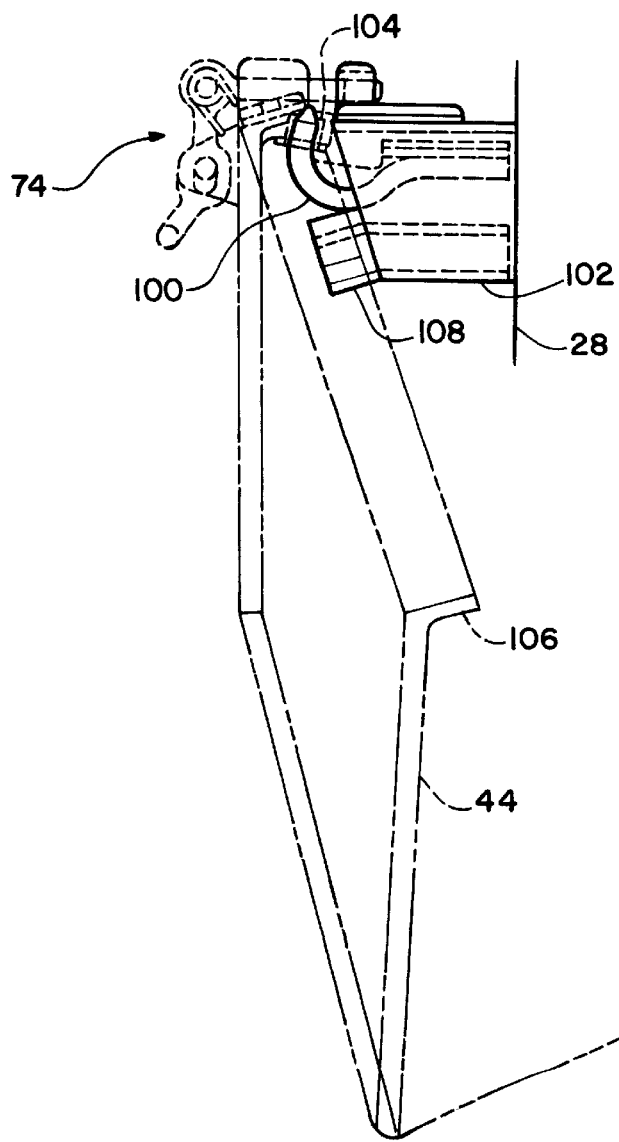
FIG. 9 is a partial sectional view illustrating another embodiment for engagement of the kicker plate with the reverser door during its deployment.

Referring now to FIGS. 9 and 10, an alternative embodiment for ensuring positive engagement of the kicker plate 44 with the thrust reversing door 28 is illustrated. In this embodiment instead of providing the previously disclosed complementary "V" shaped edge/groove arrangement, a plurality of spaced outwardly extending shear pins 100 are secured to the forward flange portion 102 of the door 28 and as the door 28 is pivotally rotated to a second, thrust reversing position the shear pins 100 are received in apertured bushings 104 provided in suitable bosses secured to the under side of the flange portion 106 of the kicker plate 44, in place of the "V" edge 64, to positively engage the two pivoting elements of the thrust reversing system 10. Also, resilient pad members 108 may be interposed between the kicker plate 44 and the door 28 by securement to either element to damp any vibration that may be induced in the kicker plate 44 by the reversed air flow in the second, reverse thrust position of the door 28. As seen in FIGS. 9 and 10, the spaced pads 108 are suitably secured to the flange 102 and, upon positive engagement of the kicker plate 44 with the door 28, bear against the flange 106 of the kicker plate 44 to damp any vibration therebetween that may tend to occur with the door 28 is deployed to its second, thrust reversing position.

The present disclosure includes that contained in the appended claims as well as that of the foregoing description. Although this invention has been described in its preferred forms with a certain degree of particularity, it is understood that the present disclosure of preferred forms has been made only by way of example and numerous changes in the details of construction and combination and arrangement of parts and method steps may be resorted to without departing from the spirit and scope of the invention.

What is claimed is:

1. A thrust reverser for a turbofan aircraft jet engine having a non-translatable housing extending around a longitudinal axis of the cowl of the core jet engine with an exterior surface, an interior surface defining an outer boundary of a cold air flow duct and defining a lateral opening, the thrust reverser comprising:

at least one thrust reversing door pivotally attached to the housing so as to be movable between a first, forward thrust position wherein an outer surface of the door is substantially flush with the exterior surface of the housing and an inner surface of the door is substantially flush with the interior surface of the housing and the door covers the lateral opening, and a second, reverse thrust position wherein the lateral opening is uncovered and the door directs the air through the lateral opening to provide a reverse thrust force;

a stationary frame extending between the exterior and interior surfaces of the housing;

actuator means attached to the frame and to the door to move the door between its first and second positions;

deflector means pivotally secured to said thrust reversing door and movable from a secured stowed position to a deployed position as said thrust reversing door is moved to the second, reverse thrust position to direct air flowing through the duct and through the lateral opening to be deflected forwardly, and clamp means carried by the deflector means and cooperating with the actuator means to cause the deflector means, as the thrust reversing door is being rotated to a reverse thrust position, to be pivotally rotated toward the interior surface of the housing until it reaches its fully deployed position by engaging a portion of the thrust reverser door.

2. The thrust reverser according to claim 1 wherein said clamp means includes spring loaded clamp means that are secured to the deflector means and which cooperate with a longitudinal body portion of the actuator means to clampingly secure the deflector means to said body portion as the thrust reversing door is pivoted toward a second, reverse thrust position until the deflector means engages the thrust reversing door and is thereafter disengaged from clamping engagement with said actuator body portion.

3. The thrust reverser according to claim 2 wherein the clamp means comprises opposing spring loaded roller clamps which engage a cam portion positioned on the body portion of the actuator in the first position of the thrust reverser door, which release the cam portion when the deflector means engages a portion of the thrust reversing door as it is pivoted to a thrust reversing position, and then clampingly re-engages said cam portion of the actuator means as the thrust reversing door is returned to its first, forward thrust position.

4. The thrust reverser according to claim 3 further comprising latch means carried by the deflector means to securely lock the deflector means to the thrust reversing door when the deflector means engages a portion of the thrust reverser door as it is pivoted to a thrust reversing position and as the roller clamps release the cam portion of the actuator means.

5. The thrust reverser according to claim 4 wherein said latch means further comprises shear pin means that are lockingly inserted through an aperture in said deflector means into lug means positioned on said thrust reversing door.

6. The thrust reverser according to claim 5 wherein said latch means further includes a pivotable spring loaded latch member to which said shear pin means is pivotally secured for insertion into said lug means when the deflector means engages a portion of the thrust reverser door as it is pivoted into a thrust reversing position to lock the deflector means in a fully extended position.

7. The thrust reverser according to claim 6 which further comprises cam means positioned on said stationary frame and cooperating with said latch member to secure the latch member in a position which provides for the shear pins to be withdrawn from the lug means when the thrust reversing door is in a first, forward thrust position and to cause the latch member to pivot into a shear pin insertion position when the deflector means engages a portion of the thrust reversing door as it pivoted into a second, thrust reversing position.

8. The thrust reverser according to claim 1 wherein said thrust reversing door has a leading edge vertical height which is substantially the same as the vertical height of the stationary frame and a trailing edge vertical height that is substantially less than that of the leading edge and the deflector means has a leading edge that is substantially the same vertical height as the leading edge of the thrust reversing door whereby when the thrust reversing door is moved to its second, reverse thrust position the deflector means extends normally from the inner surface of the thrust reversing door to provide an extended up stream component to the reversed cold air flow.

9. The thrust reverser according to claim 1 further comprising a plurality of spaced outwardly extending shear pins positioned at the inner leading edge of the thrust reverser door that lockingly engage a plurality of spaced apertured lugs positioned on the deflector means as the deflector means reaches its deployed position by engaging a portion of the thrust reverser.

10. The thrust reverser according to claim 9 further comprising a plurality of spaced resilient pads interposed between the deflector means and the inner leading edge of the thrust reversing door when the deflector means is moved to a deployed position to damp any vibration that may be created during the engagement of the deflector means and the thrust reversing door in its second, reverse thrust position.

11. A thrust reverser according to claim 1 further comprising a "V" shaped forward edge portion of the deflector means that is received in a complementarily shaped "V" groove portion provided in a inner forward portion of said door when the deflector means is rotated to a deployed position as the thrust reversing door is moved to its second, reverse thrust position.

12. In a turbofan aircraft jet engine propulsion system having an annular wall defining an exhaust passage substantially coaxial with the longitudinal axis of the core cowl of the jet engine for air driven by the turbofan in an upstream-to-downstream direction, the annular wall defining at least one generally laterally facing opening, an outer air flow surface and an inner air flow surface, the improved thrust reverser system comprising:

at least one thrust reversing door having an upstream edge, a downstream edge, an outer surface and an inner surface substantially flush with the inner air flow surface of said wall;

means for pivotally attaching the thrust reversing door to the annular wall such that it pivots about a first pivot axis;

actuating means for moving the thrust reversing door between a first position wherein it covers the at least one laterally facing opening such that the outer surface of said door is substantially flush with the outer air flow surface of the annular wall and air flow through the exhaust passage is unimpeded, and a second position wherein the laterally facing opening is uncovered and the thrust reversing door directs air outwardly through the opening so as to have an upstream acting component;

a kicker plate having a distal edge, and attaching means for pivotally attaching the kicker plate to the thrust reverser door adjacent to the downstream edge such that it pivots about a second pivot axis and is rotatable from a retracted position wherein the distal edge of the kicker plate does not extend beyond the inner surface of the thrust reverser door when the door in is in the first position thereby allowing the inner surface of the thrust reverer door to be generally flush with the inner air flow surface of the annular duct, and an extended position wherein the distal edge extends substantially beyond the inner surface when the door is in the second position so as to direct the air flowing from the lateral opening in a generally upstream direction.

13. The improved thrust reverser according to claim 12 further comprising at least one longitudinal partition attached to the annular wall extending therefrom in a downstream direction and the partition having a downstream edge adjacent to the upstream edge of the thrust reverser door.

14. The improved thrust reverser according to claim 13 wherein the attaching means further comprises a first latch means which releasably secures the kicker plate to the actuating means as it moves the thrust reversing door to a second, thrust reversing position and the kicker plate engages an upstream edge of the thrust reversing door as the latch means releases the kicker plate from securement therewith.

15. The improved thrust reverser according to claim 14 wherein the actuating means includes a longitudinally extending actuator having a body portion and being pivotally attached at a first end to said partition and at a second end to the thrust reversing door and the attaching means includes a spring loaded roller clamp means carried by the kicker plate for releasable clamping engagement with the body portion of said actuator.

16. The improved thrust reverser system according to claim 14 which further comprises a second latch means that cooperates with the kicker plate and said partition to lockingly couple the kicker plate to the thrust reversing door when the kicker plate engages an upstream edge of the thrust reversing door as said door is moved to its second, thrust reversing position by the actuating means.

17. The improved thrust reverser system according to claim 16 wherein the second latch means further includes cam means positioned on said longitudinal partition that cooperates with a pivotable latch member carried on said kicker plate that is actuable to insert a shear pin carried by said kicker plate through said kicker plate into lug means carried by said door when the kicker plate engages the leading edge of said thrust reversing door during its rotation to a second, thrust reversing position and which is actuable to withdraw said shear pin when the thrust reversing door is rotated to said first position.

18. The improved thrust reverser system according to claim 17 further comprising a plurality of spaced outwardly extending shear pins positioned at an inner upstream edge portion of said thrust reversing door for engagement with said kicker plate as said door is rotated to a second, thrust reversing position by said actuating means.

19. The improved thrust reverser system according to claim 18 further comprising a plurality of apertured lug means arranged on the kicker plate for receiving the shear pins positioned on the thrust reversing door and resilient means positioned between said kicker plate and the upstream edge of the thrust reversing door when the kicker plate engages the leading edge of the thrust reversing to damp any vibration therebetween during such period as the thrust reversing door resides in its second, thrust reversing position.

20. The improved thrust reverser system according to claim 17 further comprising the kicker plate being provided with a "V" shaped edge portion down stream of the distal edge thereof that is adapted to be received in a complementarily "V" shaped groove portion in the upstream edge of said door as the first latch means disengages from clamping engagement with the actuator means as said thrust reversing door is rotated to a second, thrust reversing position.

* * * * *